US012676100B2

(12) United States Patent
Jeong et al.

(10) Patent No.: US 12,676,100 B2
(45) Date of Patent: Jul. 7, 2026

(54) DISPLAY DEVICE AND DRIVING METHOD THEREOF

(71) Applicant: LG Display Co., Ltd., Seoul (KR)

(72) Inventors: Uitaek Jeong, Paju-si (KR); Mookyoung Hong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/489,683

(22) Filed: Oct. 18, 2023

(65) Prior Publication Data

US 2024/0212573 A1 Jun. 27, 2024

(30) Foreign Application Priority Data

Dec. 27, 2022 (KR) ........................ 10-2022-0186161

(51) Int. Cl.
*G09G 3/20* (2006.01)
*G09G 3/3233* (2016.01)
*G09G 3/3275* (2016.01)

(52) U.S. Cl.
CPC ......... *G09G 3/2096* (2013.01); *G09G 3/3233* (2013.01); *G09G 3/3275* (2013.01);
(Continued)

(58) Field of Classification Search
CPC ......... G09G 3/2096; G09G 3/32–3291; G09G 2300/0819; G09G 2300/0842; G09G 2310/0251; G09G 2310/0286; G09G 2310/0291; G09G 2310/0294; G09G 2310/0297; G09G 2320/0233; G09G 2320/0673; G09G 2370/00; G09G 2300/0828; G09G 2310/08; G09G 2320/0271; G09G 2320/0276; G09G 2320/043; G09G 2320/045; G09G 2310/061; G11C 19/28–287
See application file for complete search history.

(56) References Cited

U.S. PATENT DOCUMENTS

| | | | | |
|---|---|---|---|---|
| 9,076,387 | B1 * | 7/2015 | Lee .......................... | G09G 3/20 |
| 2002/0027551 | A1 | 3/2002 | Nitta et al. | |

(Continued)

FOREIGN PATENT DOCUMENTS

| | | | |
|---|---|---|---|
| JP | H11175027 | A | 7/1999 |
| JP | 2012194276 | A | 10/2012 |

(Continued)

*Primary Examiner* — Amr A Awad
*Assistant Examiner* — Aaron Midkiff
(74) *Attorney, Agent, or Firm* — Seed Intellectual Property Law Group LLP

(57) ABSTRACT

The embodiments relate to a display device and driving method thereof. The display device includes a display panel including a plurality of pixels arranged thereon, a data driver configured to apply a sensing data voltage to the plurality of pixels and output a characteristic value sensed in response to the sensing data voltage as sensing data, and a timing controller configured to compensate video data based on the sensing data and transmit compensated video data and a control signal to the data driver, wherein the timing controller applies a first sensing data voltage to the plurality of pixels in a normal sensing drive mode and a second sensing data voltage higher than the first sensing data voltage to the plurality of pixels in an overdriving sensing drive mode.

15 Claims, 10 Drawing Sheets

(52) U.S. Cl.
CPC ............... *G09G 2300/0819* (2013.01); *G09G 2300/0842* (2013.01); *G09G 2310/0251* (2013.01); *G09G 2310/0286* (2013.01); *G09G 2310/0291* (2013.01); *G09G 2310/0294* (2013.01); *G09G 2310/0297* (2013.01); *G09G 2320/0233* (2013.01); *G09G 2320/0673* (2013.01); *G09G 2370/00* (2013.01)

(56) References Cited

U.S. PATENT DOCUMENTS

| | | | | |
|---|---|---|---|---|
| 2007/0222718 | A1* | 9/2007 | Takahara ............. | G09G 3/3233 345/76 |
| 2011/0122119 | A1* | 5/2011 | Bae ...................... | G09G 3/3233 345/211 |
| 2015/0154908 | A1 | 6/2015 | Nam et al. | |
| 2015/0379937 | A1 | 12/2015 | Kim et al. | |
| 2018/0012553 | A1* | 1/2018 | Kim ..................... | G09G 3/3614 |
| 2018/0061913 | A1* | 3/2018 | Kim ..................... | G09G 3/3233 |
| 2020/0152135 | A1* | 5/2020 | Kang ................... | G09G 3/3291 |
| 2020/0202787 | A1* | 6/2020 | Do ....................... | G09G 3/2007 |
| 2021/0248943 | A1* | 8/2021 | Kim ......................... | G09G 3/20 |
| 2021/0335277 | A1* | 10/2021 | Hwang ................ | G09G 3/3275 |
| 2022/0223088 | A1* | 7/2022 | Ban ...................... | G09G 3/3291 |

FOREIGN PATENT DOCUMENTS

| | | | |
|---|---|---|---|
| JP | 2014123125 | A | 7/2014 |
| JP | 2015108828 | A | 6/2015 |
| JP | 2016009185 | A | 1/2016 |
| JP | 2017120409 | A | 7/2017 |
| KR | 1999-0062856 | A | 7/1999 |
| KR | 10-2015-0064798 | A | 6/2015 |
| KR | 10-2016-0001822 | A | 1/2016 |
| KR | 20160083188 | A | 7/2016 |
| KR | 20170080993 | A | 7/2017 |
| KR | 10-2022-0096085 | A | 7/2022 |

* cited by examiner

DISPLAY DEVICE AND DRIVING METHOD THEREOF

CROSS REFERENCE TO RELATED APPLICATION

The present application claims priority to Korean Patent Application No. 10-2022-0186161, filed on Dec. 27, 2022, the entire contents of which is incorporated herein for all purposes by this reference.

BACKGROUND

Technical Field

The present disclosure relates to a display device and driving method thereof.

Description of the Related Art

With the advancement of the information society, there is an increasing demand for display devices that can show images, and various types of display devices such as liquid crystal display (LCD) devices and organic light-emitting diode (OLED) displays are being utilized.

The driving transistors equipped on the pixels of a display device have characteristic values such as threshold voltage and mobility, and as the driving time increases, the pixels degrade, resulting in changes to the characteristic values. To compensate for the changes in characteristic values, a compensation method can be applied to a display device by operating the display device in a sensing drive mode to sense the characteristic values of the pixels and compensate data to be applied to the pixels based on the sensed values.

Recently, the higher resolution of display devices has led to an increase in the number of pixels, which in turn increase the time required for pixel sensing.

BRIEF SUMMARY

Embodiments provide a display device and driving method thereof capable of reducing the time for pixel sensing.

Embodiments provide a display device having an improved data driver and driving method thereof that is capable of enhancing compensation reliability based on pixel sensing.

A display device according to an embodiment may include a display panel including a plurality of pixels arranged thereon, a data driver configured to apply a sensing data voltage to the plurality of pixels and output a characteristic value sensed in response to the sensing data voltage as sensing data, and a timing controller configured to compensate video data based on the sensing data and transmit compensated video data and a control signal to the data driver.

The timing controller may apply a first sensing data voltage to the plurality of pixels in a normal sensing drive mode and a second sensing data voltage higher than the first sensing data voltage to the plurality of pixels in an overdriving sensing drive mode.

The timing controller may calculate a gain value and an offset value for compensating the video data based on the sensing data and transmit the gain value-compensated video data and the offset data to the data driver.

The data driver may compensate the video data received from the timing controller based on the received offset value.

The data driver may include a receiver configured to receive the video data from the timing controller, a shift register configured to output a sampling signal in response to the control signal, a latch configured to latch and output the video data in response to the sampling signal, a digital-to-analog converter configured to convert the video data output from the latch into an analog data voltage, an output buffer configured to supply the data voltage output from the digital-to-analog converter to the plurality of pixels through a data line, and an offset compensator configured to convert the offset value received from the timing controller into an analog offset voltage and provide the analog offset value to the digital-to-analog converter.

The digital-to-analog converter includes a resister string configured to divide between a first gamma reference voltage and a second gamma reference voltage and output a plurality of gamma gradation voltages, and a switch unit configured to output a gamma gradation voltage, among the plurality of gamma gradation voltages, corresponding to the video data output from the latch, wherein the offset compensator may be connected to an output terminal of the switch unit.

The control signal may include a 2-bit data indicative of the normal sensing drive mode, the overdriving sensing drive mode, and a sensing pre-charge driving mode.

The timing controller may apply the sensing data voltage to the plurality of pixels during an initialization period, sense, upon a sensing voltage is charged to the pixels during a tracking period, the sensing voltage during a sampling period, apply a second sensing data voltage to the plurality of pixels during the initialization period in the overdriving sensing drive mode, and apply the first sensing data voltage lower than the second sensing data voltage to the plurality of pixels during the sampling period.

The timing controller may apply a pre-charge data voltage lower than the first sensing data voltage to the plurality of pixels during a pre-charge period in the sensing pre-charge drive mode and apply the first sensing data voltage to the plurality of pixels during the initialization period.

The control signal may include an offset value for compensating an offset of the video data in the overdriving sensing drive mode and an offset value for compensating the offset of the video data in the sensing pre-charge drive mode.

A display device according to an embodiment may include a display panel including a plurality of pixels arranged thereon, a data driver configured to apply a sensing data voltage to the plurality of pixels and output a characteristic value sensed in response to the sensing data voltage as sensing data, and a timing controller configured to compensate video data based on the sensing data and transmit compensated video data and a control signal to the data driver.

The timing controller may calculate a gain value and an offset value for compensating the video data based on the sensing data and transmit the gain value-compensated video data and the offset value to the data driver, and the data driver may compensate the video data received from the timing controller based on the received offset value.

The data driver may include a receiver configured to receive the video data from the timing controller, a shift register configured to output a sampling signal in response to the control signal, a latch configured to latch and output the video data in response to the sampling signal, a digital-to-analog converter configured to convert the video data output from the latch into an analog data voltage, an output buffer configured to supply the data voltage output from the digital-to-analog converter to the plurality of pixels through a data line, and an offset compensator configured to convert the offset value received from the timing controller into an analog offset voltage and provide the analog offset value to the digital-to-analog converter.

The timing controller may transmit a sensing drive mode and the offset value corresponding to the sensing drive mode to the data driver.

The data driver may apply a first sensing data voltage to the plurality of pixels in a normal sensing drive mode and a second sensing data voltage higher than the first sensing data voltage to the plurality of pixels in an overdriving sensing drive mode.

A method for driving a display device according to an embodiment may include applying a second sensing data voltage to the plurality of pixels during an initialization period, charging the pixels with a sensing voltage during a tracking period, outputting sensing data by sensing the sensing voltage applying a first sensing data voltage to the pixels during a sampling period, and compensating video data to be applied to the plurality of pixels based on the sensing data, wherein the second sensing data voltage may be set to be higher than the first sensing data voltage.

The compensating of the video data may include calculating, by the timing controller, a gain value and an offset value for compensating the video data based on the sensing data, compensating the video data based on the gain value, and transmitting the gain value-compensated video data and the offset value to the data driver.

The compensating of the video data may further include compensating, by the data driver, the video data received from the timing controller based on the received offset value.

DETAILED DESCRIPTION

Figure 1:
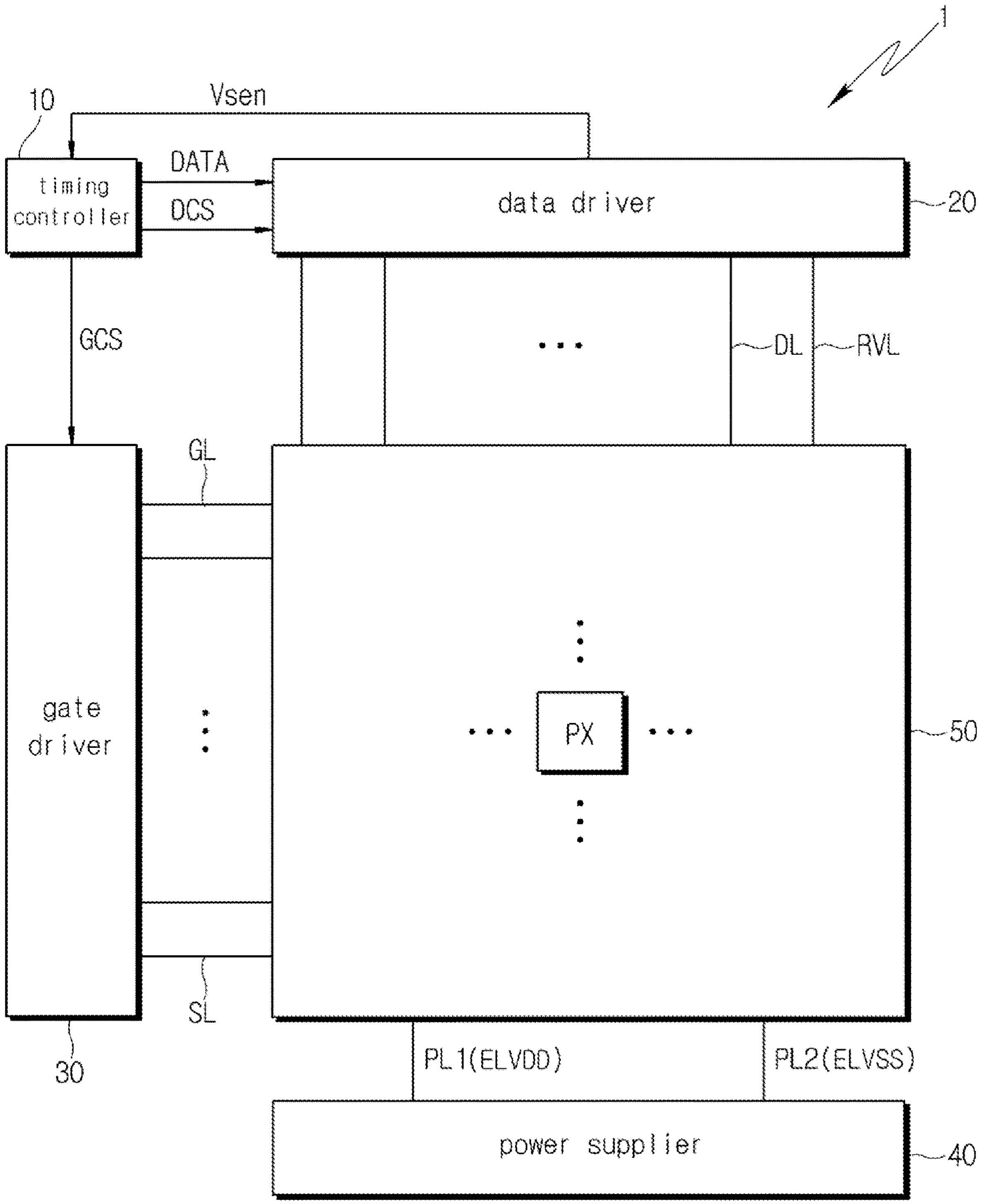
FIG. 1 is a block diagram illustrating a display device according to an embodiment.

Hereinafter, embodiments will be described with reference to accompanying drawings. In the specification, when a component (or area, layer, part, etc.) is mentioned as being "on top of," "connected to," or "coupled to" another component, it means that it may be directly connected/coupled to the other component, or a third component may be placed between them.

The same reference numerals refer to the same components. In addition, in the drawings, the thickness, proportions, and dimensions of the components are exaggerated for effective description of the technical content. The expression "and/or" is taken to include one or more combinations that can be defined by associated components.

The terms "first," "second," etc., are used to describe various components, but the components should not be limited by these terms. The terms are used only for distinguishing one component from another component. For example, a first component may be referred to as a second component and, similarly, the second component may be referred to as the first component, without departing from the scope of the present disclosure. As used herein, the singular forms are intended to include the plural forms as well, unless the context clearly indicates otherwise.

The terms such as "below," "lower," "above," "upper," etc., are used to describe the relationship of components depicted in the drawings. The terms are relative concepts and are described based on the direction indicated on the drawing.

It will be further understood that the terms "comprises," "has," and the like are intended to specify the presence of stated features, numbers, steps, operations, components, parts, or a combination thereof but are not intended to preclude the presence or possibility of one or more other features, numbers, steps, operations, components, parts, or combinations thereof.

FIG. 1 is a block diagram illustrating a display device according to an embodiment.

With reference to FIG. 1, the display device 1 includes a timing controller 10, a data driver 20, a gate driver 30, a power supplier 40, and a display panel 50.

The timing controller 10 receives control signals and video data from an external system (e.g., a host) and generates source control signals DCS and gate control signals GCS. The control signals may include a data enable signal, a horizontal sync signal, a vertical sync signal, and the main clock.

The gate control signals GCS may include scan timing control signals such as gate start pulse, gate shift clock, and gate output enable signal. The source control signals DCS may include data timing control signals such as source sampling clock, polarity control signal, and source output enable signal.

The timing controller 10 may be placed on a control printed circuit board connected to the source printed circuit board, on which the data driver 20 is bonded, through a connection medium such as flexible flat cable (FFC) or flexible printed circuit (FPC). For example, the timing controller 10 may be connected to the data driver 20 through embedded clock Point-to-Point interface (EPI) wire pairs to transmit and receive data.

The data driver 20 may convert the digital video data (DATA) received from the timing controller 10 into analog data signals according to the source control signal DCS. The data driver 20 may apply the analog data signals to corresponding pixels PX through the data lines DL.

In an embodiment, the data driver 20 may also be further connected to the pixels PX via the readout lines RVL. The data driver 20 may provide a reference voltage to the pixels PX or sense the state of the pixels PX based on the feedback electrical signals from the pixels PX through the readout lines RVL. In this embodiment, the timing controller 10 may generate compensated video data by compensating the video data based on the sensing data Vsen acquired through the data driver 20. The compensation of the video data may involve compensating for one or more of the threshold voltage and mobility of the driving transistors and/or operating point voltage of the organic light-emitting diodes for the pixels PX. By supplying the compensated video data to the data driver 20, image quality degradation such as blotches on the display panel 50 may be improved.

The data driver 20 may be implemented as a source drive circuit or a source drive integrated circuit (IC). The data driver 20 may be connected to the bonding pads of the display panel 50 using tape automated bonding (TAB) or chip on glass (COG) methods, or directly arranged on the display panel 50, and in some cases, it may be integrated and arranged within the display panel 50.

The gate driver 30, in response to the gate control signals GCS received from the timing controller 10, may sequentially output scan signals within one horizontal period through the gate lines GL. Accordingly, the pixel rows connected to each gate line GL may be turned on in one horizontal period. During one horizontal period, data signals may be applied to the turned-on pixel rows through the gate lines GL.

In an embodiment, the gate driver 30 may be further connected to the pixels PX via the sensing lines SL. The gate driver 30 may apply sensing signals to the pixels PX through the sensing lines SL during a sensing period to sense the pixels PX.

The gate driver 30 may be composed of stage circuits connected to a plurality of gate lines GL and may be implemented in a gate in panel (GIP) form integrated on the display panel 50, as illustrated. The gate driver 30 may include shift registers, level shifters, or the like.

The power supplier 40 may convert the external input voltage into internal standard high-potential voltages ELVDD and low-potential voltage ELVSS for use in in the display device 1 and output them to the components through power lines PL1 and PL2. The power supplier 40 may be arranged on the control printed circuit board where the timing controller 10 is positioned. Such a power supplier 40 may be referred to as a power management IC (PMIC).

The display panel 50 includes a plurality of pixels PX (or sub-pixels) arranged thereon. The pixels PX may be arranged in a matrix form on the display panel, for example. The pixels PX arranged in one pixel row are connected to the same gate line GL, and the pixels PX arranged in one pixel column are connected to the same data line DL. The pixels PX may emit light corresponding to the data signal supplied through the data lines DL.

In an embodiment, each pixel PX may display one of the colors, red, green, or blue. In another embodiment, each pixel PX may display one of the colors, cyan, magenta, or yellow. In various embodiments, each pixel PX may display one of the colors, red, green, blue, or white.

The timing controller 10, data driver 20, gate driver 30, and power supplier 40 may be configured as separate discrete integrated circuits (ICs), or some of them may be integrated into a single IC.

Figure 2:
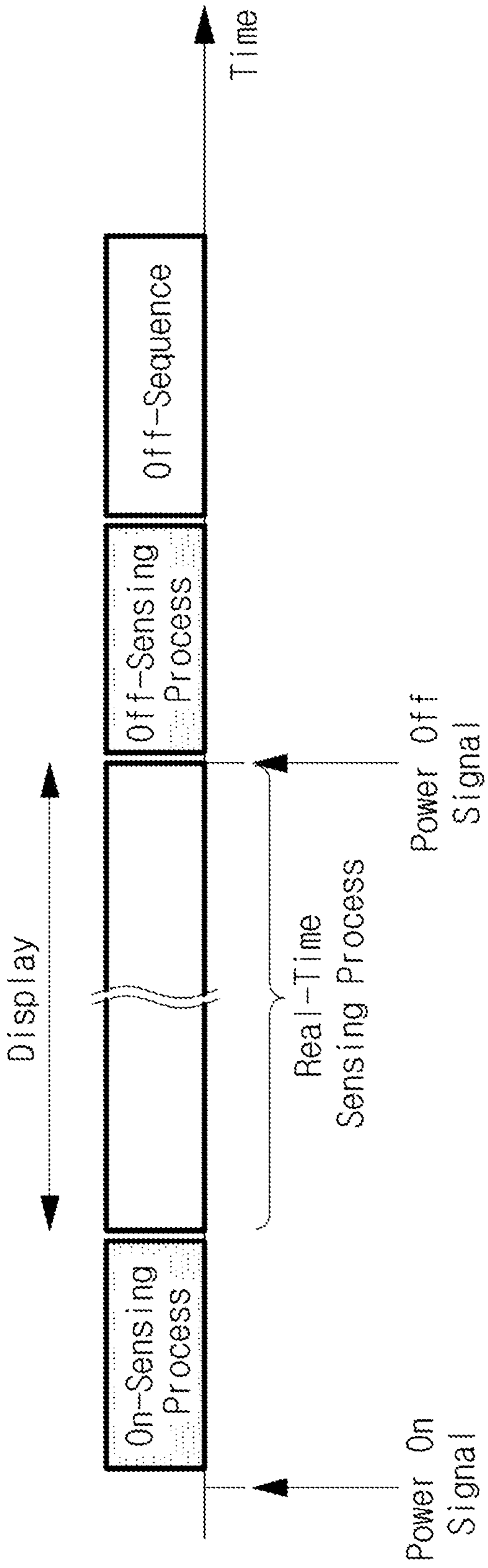
FIG. 2 is a diagram illustrating sensing timing according to an embodiment.

FIG. 2 is a diagram illustrating sensing timing according to an embodiment.

With reference to FIG. 2, when a power-on signal is generated, the display device 1 may sense the characteristic values of the driving transistors within each pixel PX arranged on the display panel 50. This sensing process is referred to as the "on-sensing process."

Additionally, when a power-off signal is generated before the initiation of the off-sequence, such as power shutdown, the display device 1 may also sense the characteristic values of the driving transistors within each pixel PX arranged on the display panel 50. This sensing process is referred to as the "off-sensing process."

The display device 1 may also sense the characteristic values of the driving transistors within each pixel PX arranged on the display panel 50 during blank periods in the display operation from the generation of the power-on signal until the generation of the power-off signal. This real-time sensing process is referred to as the "real-time sensing process." The real-time sensing process may be carried out during the blank time between active periods, based on the vertical sync signal.

Figure 3:
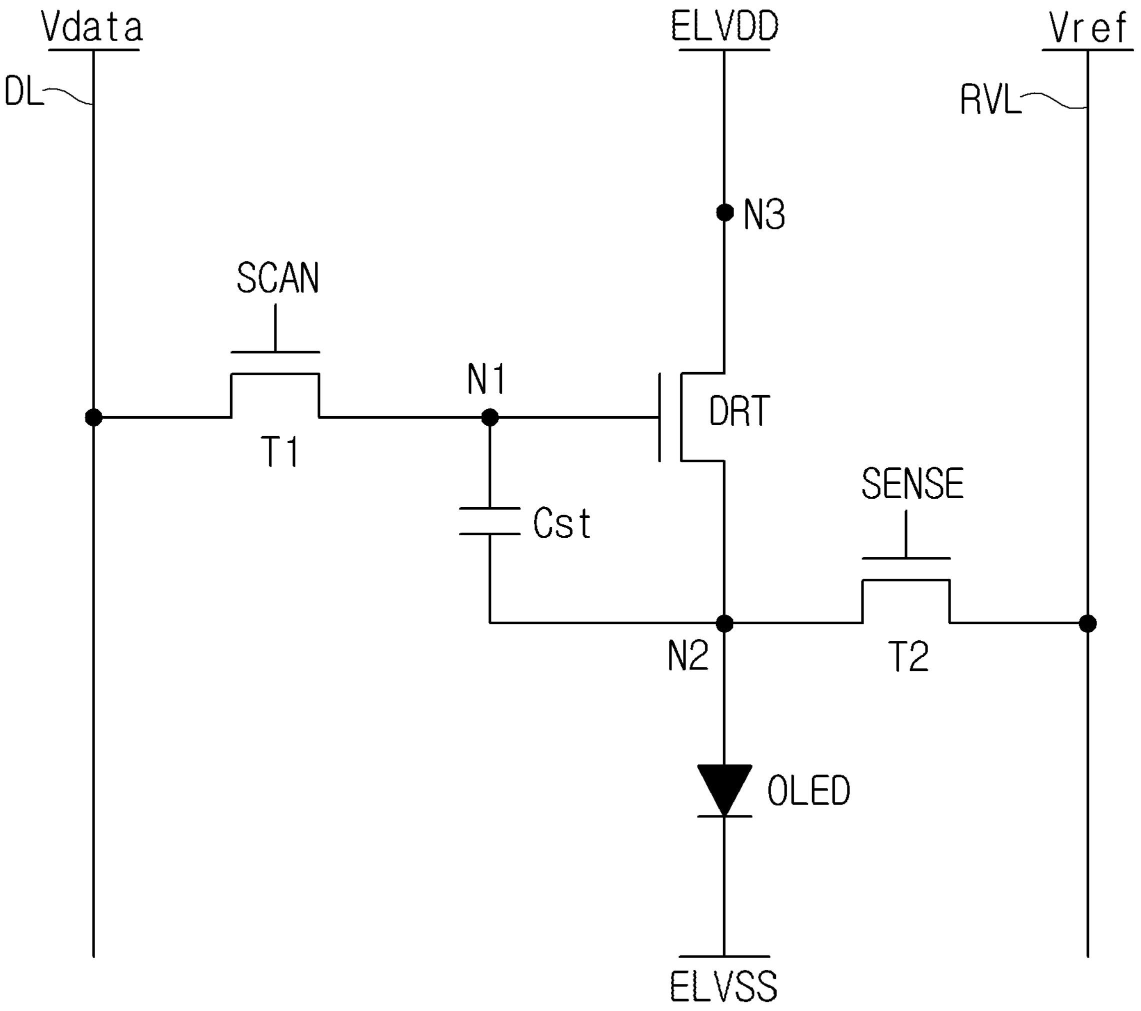
FIG. 3 is a circuit diagram illustrating a pixel in FIG. 1.

FIG. 3 is a circuit diagram illustrating a pixel in FIG. 1.

With reference to FIG. 3, a pixel PX is composed of an organic light-emitting diode OLED, a driving transistor DRT that drives the OLED, a first transistor T1 that delivers data voltage to the gate node of the driving transistor DRT known as the first node N1, and a storage capacitor Cst that may maintain the data voltage or a voltage corresponding to the video signal voltage for a frame duration.

The organic light-emitting diode OLED may include a first electrode (e.g., an anode electrode or a cathode electrode), an organic layer, and a second electrode (e.g., a cathode electrode or an anode electrode). The second electrode of the organic light-emitting diode OLED may be supplied with a base voltage ELVSS.

The driving transistor DRT drives the organic light-emitting diode OLED by supplying driving current to the organic light-emitting diode OLED. The driving transistor DRT may have a first node N1, a second node N2, and a third node N3. The first node N1 of the driving transistor DRT is the gate node, which may be electrically connected to the source node or drain node of the first transistor T1. The second node N2 of the driving transistor DRT may be electrically connected to the first electrode of the organic light-emitting diode OLED and may be the source node or the drain node. The third node N3 of the driving transistor DRT is applied with a driving voltage ELVDD and may be the drain node or the source node.

The first transistor T1 is electrically connected between the data line DL and the first node N1 of the driving transistor DRT and applied with the scan signal SCAN at the gate node thereof. The first transistor T1 is turned on by the scan signal SCAN and may transmit the data voltage Vdata supplied through the data line DL to the first node N1 of the driving transistor DRT.

The storage capacitor Cst may be electrically connected between the first node N1 and the second node N2 of the driving transistor DRT.

As the drive time of the pixel PX increases, the circuit components such as organic light-emitting diodes OLED and the driving transistor DRT may degrade. Accordingly, the circuit components such as the organic light-emitting diode OLED and the driving transistor DRT may undergo changes in their inherent characteristic values. Here, the characteristic values may include the threshold voltage of the organic light-emitting diode OLED, the threshold voltage of the driving transistor DRT, and the mobility of the driving transistor DRT, among others.

Changes in the characteristic values of circuit components may lead to variations in the luminance of the corresponding pixel PX Additionally, the extent of characteristic value changes between circuit components may vary depending on the degradation degree of the pixel PX. Differences in characteristic values may result in luminance deviations among pixels.

To address these issues, in an embodiment, the pixel PX may incorporate a compensation circuit for detecting characteristic values of the pixel PX and compensating for characteristic value changes.

With reference to FIG. 3, the pixel PX may include a second transistor T2. The second transistor T2 is electrically connected between the second node N2 of the driving transistor DRT and a readout line RVL that supplies a reference voltage Vref and may be controlled by a sensing signal SENSE, which is a type of scan signal, applied to its gate node. The second transistor T2 turns on in response to the sensing signal SENSE and applies the reference voltage Vref, supplied through the readout line RVL, to the second node N2 of the driving transistor DRT. The second transistor T2 may also serve as one of the voltage sensing paths for the second node N2 of the driving transistor DRT.

In an embodiment, the scan signal SCAN and the sensing signal SENSE may be separate scan signals. In this case, the scan signal SCAN and the sensing signal SENSE may be applied to the gate nodes of the first transistor T1 and the second transistor T2, respectively, through different gate lines.

In another embodiment, the scan signal SCAN and the sensing signal SENSE may be the same gate signal. In this case, the scan signal SCAN and the sensing signal SENSE may be commonly applied to the gate nodes of both the first transistor T1 and the second transistor T2 through the same gate line.

Figure 4:
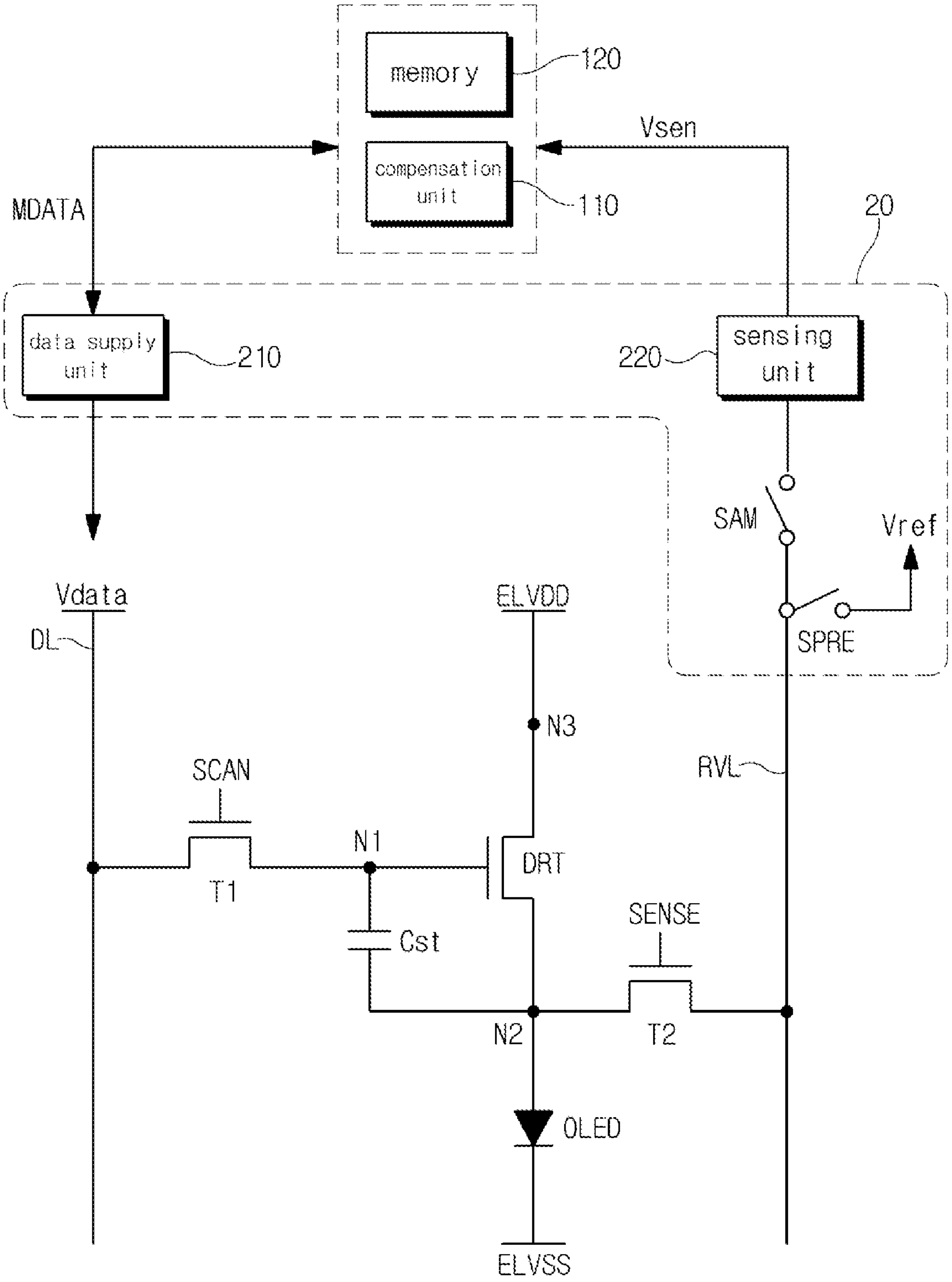
FIG. 4 is a diagram illustrating a compensation circuit according to an embodiment.

FIG. 4 is a diagram illustrating a compensation circuit according to an embodiment.

With reference to FIG. 4, the display device 1 may include a sensing unit 220 that generates sensing data Vsen through voltage sensing of the pixel PX and outputs the sensing data, a compensation unit 110 that determines the characteristic values of the pixel PX based on the sensing data Vsen and performs a compensation process to compensate for the characteristic values, and a memory 120 that stores the initially preset compensation data (or initial compensation values) and the compensation values generated by the compensation unit 110.

Figure 11:
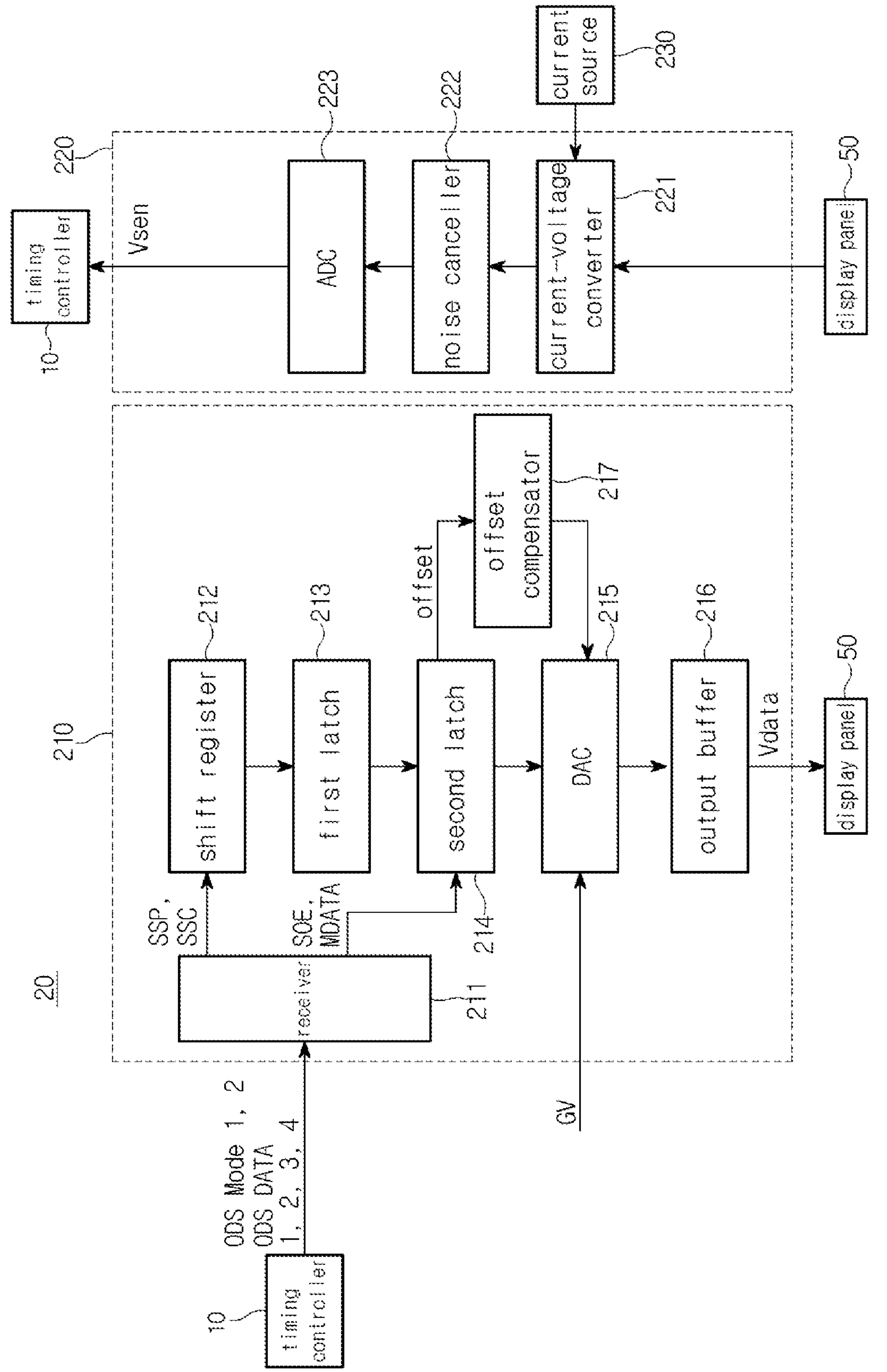
FIG. 11 is a block diagram illustrating a configuration of a data driver according to an embodiment.

The sensing unit 220 may be implemented to include at least one analog-to-digital converter (ADC) (223 in FIG. 11). This sensing unit 220 may be arranged inside the data driver 20 as shown in the drawing. The sensing data Vsen output from the sensing unit 220 may have a low voltage differential signaling (LVDS) data format.

The compensation unit 110 and the memory 120 may be arranged inside the timing controller 10. The memory 120 may receive the sensing data Vsen from the sensing unit 220, store the received sensing data, and transmit the stored sensing data Vsen to the compensation unit 110. In another embodiment, the compensation unit 110 may directly receive the sensing data Vsen, compute the compensation value, and store the compensation value and sensing data Vsen in the memory 120.

The memory 120 may store preset initial compensation data and the sensing data Vsen received from the sensing unit 220 or the compensation value computed by the compensation unit 110.

The display device 1 may include an initialization switch SPRE for controlling the on/off state of the readout line RVL and a sampling switch SAM for controlling the connection between the readout line RVL and the sensing unit 220.

The initialization switch SPRE may control the voltage application state of the second node N2 of the driving transistor DRT in the pixel PX to achieve the desired characteristic values of the circuit components. When the initialization switch SPRE is turned on, the reference voltage Vref may be supplied to the readout line RVL and applied to the second node N2 of the driving transistor DRT through the turned-on second transistor T2.

When turned on, the sampling switch SAM may electrically connect the readout line RVL and the sensing unit 220. The sampling switch SAM may be controlled to turn on when the voltage state at the second node N2 of the driving transistor DRT in the pixel PX reflects the desired characteristic values of the circuit components. When the sampling switch SAM is turned on, the sensing unit 220 may sense the voltage of the connected readout line RVL.

When the sensing unit 220 senses the voltage of the readout line RVL, if the second transistor T2 is turned on and the resistive component of the driving transistor DRT can be ignored, the voltage by the sensing unit 220 may correspond to the voltage at the second node N2 of the driving transistor DRT. The voltage sensed by the sensing unit 220 may be the voltage of the readout line RVL, i.e., the voltage at the second node N2 of the driving transistor DRT.

When there is a line capacitor on the readout line RVL, the voltage sensed by the sensing unit 220 may be the voltage charged on the line capacitor on the readout line RVL. Here, the readout line RVL is also referred to as the sensing line. For example, the voltage sensed by the sensing unit 220 may be the voltage value including the threshold voltage Vth or threshold voltage deviation ΔVth of the driving transistor DRT (Vdata−Vth or Vdata−ΔVth, where Vdata is the sensing data voltage) or the voltage value used to sense the mobility of the driving transistor DRT.

The sensing unit 220 converts the sensed voltage Vsen, which is obtained for threshold voltage sensing, into a digital value and generates the sensing data Vsen including the converted digital value (sensing value) for output. The sensing data outputted from the sensing unit 220 may be provided to the compensation unit 110. In some cases, the sensing data may also be provided to the compensation unit 110 through the memory 120.

The compensation unit 110 may check the characteristic values (e.g., threshold voltage) of the driving transistor DRT or changes in the characteristic values (e.g., threshold voltage variations) within the corresponding sub-pixel, based on the sensing data Vsen received from the sensing unit 220, and perform a characteristic value compensation process. Here, the changes in characteristic values of the driving transistor DRT may refer to the change in the current sensing data Vsen compared to the previous sensing data Vsen, or the change in the current sensing data Vsen compared to the initial compensation data. Here, the initial compensation data may refer to the initial configuration data that is set and stored during the manufacturing of the display device.

The characteristic value compensation process may include a threshold voltage compensation process for compensating the threshold voltage of the driving transistor DRT. The threshold voltage compensation process involves calculating compensation values for the threshold voltage or threshold voltage deviation (threshold voltage variation) and storing the calculated compensation values in the memory 120 or modifying the corresponding video data DATA using the computed compensation values. In an embodiment, the compensation values may include an offset value and a gain value for compensating the threshold voltage or threshold voltage deviation.

The compensation unit 110 may supply the modified video data MDATA compensated by modifying the video data DATA through the threshold voltage compensation process. For example, the compensation unit 110 may compensate the video data DATA by applying the determined offset value (offset) and gain value (gain) to the video data.

In another example, the compensation unit 110 may serve as a gain compensation unit that compensates the video data DATA using the gain value (gain). In this case, the compensation unit 110 does not compensate the offset value (offset) of the video data DATA, but instead, transmits the gain-compensated video data (MDATA) to the data driver 20. Alternatively, the compensation unit 110 may transmit the offset value (offset) determined through pixel PX sensing to the data driver 20. The data driver 20 may generate the data voltage (Vdata) compensated for both the gain value (gain) and offset value (offset) by applying the offset compensation value to the gain-compensated video data MDATA, received from the timing controller 10, via an internal offset compensator (217 in FIGS. 11 and 12) or the like.

By determining the gain value (gain) for compensating video data DATA through the timing controller 10 and then compensating the video data DATA using the determined gain value (gain), it is possible to eliminate the necessity of the gain value calculation unit in the data driver 20, leading to reduction of the design complexity and allowing for the implementation of an optimized data driver 20. Furthermore, by compensating the offset value (offset) through the data driver 20, it is possible to resolve the compensation reliability degradation problem caused by noise during offset compensation in the timing controller 10.

By supplying the data voltage Vdata, which is compensated for both the gain value (gain) and the offset value (offset) in the data supply unit 210 of the data driver 20, is supplied to the corresponding pixel (PX), the pixel characteristic compensation (threshold voltage compensation) is effectively achieved. Such pixel characteristic value compensation is capable of reducing or preventing the luminance deviations among pixels (PX) effectively, leading to improvement of the image quality.

Hereinafter, a description is made of the threshold voltage sensing operation for the driving transistor DRT briefly.

Figure 5:
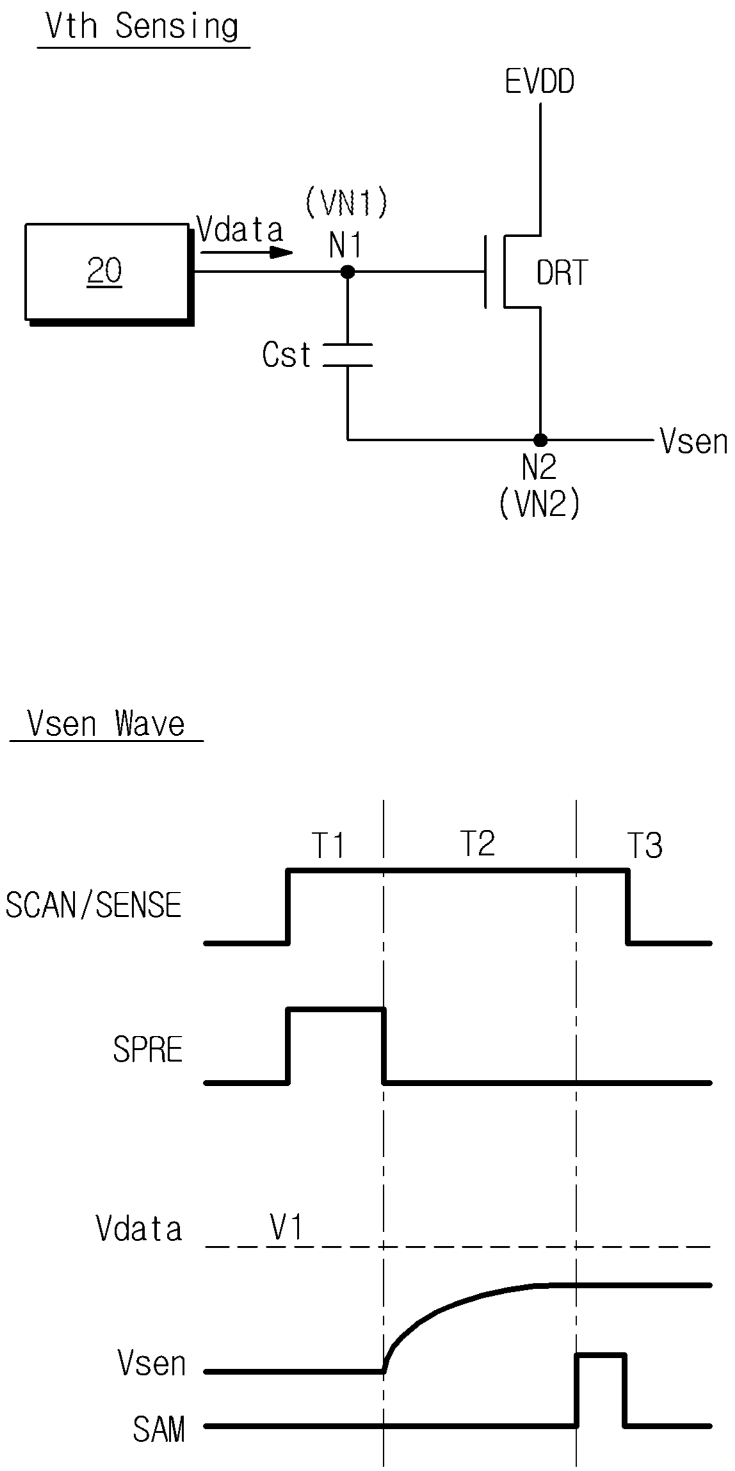
FIG. 5 is a diagram for explaining a threshold voltage sensing method for a driving transistor according to an embodiment.
Figure 6:
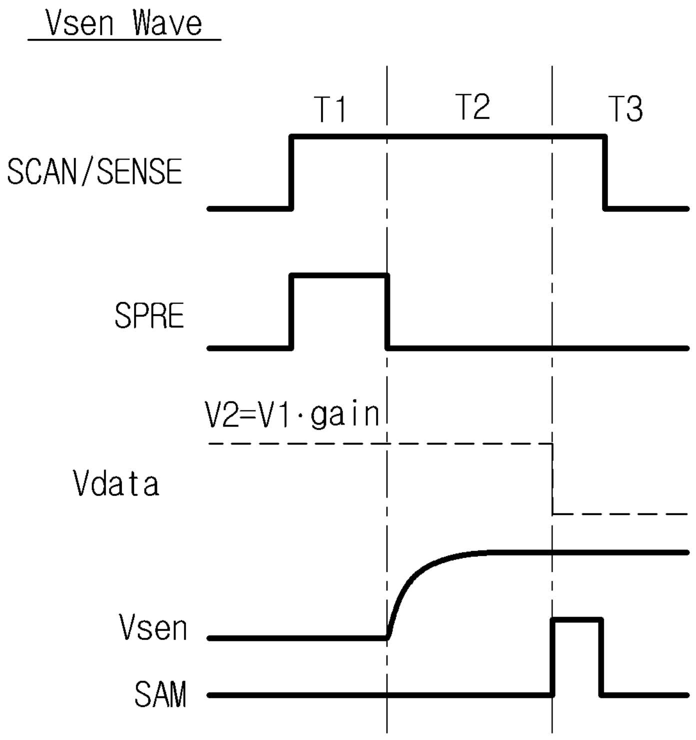
FIG. 6 is a diagram illustrating a threshold voltage sensing method for a driving transistor according to another embodiment.

FIG. 5 is a diagram for explaining a threshold voltage sensing method for a driving transistor according to an embodiment. FIG. 6 is a diagram illustrating a threshold voltage sensing method for a driving transistor according to another embodiment.

With reference to FIGS. 4 and 5, the threshold voltage sensing operation for the driving transistor DRT may be performed through a sensing process that involves an initialization period T1, a tracking period T2, and a sampling period T3.

The initialization period T1 is the duration during which the first node N1 and the second node N2 of the driving transistor DRT are initialized. During this period, the initialization switch SPRE is turned on. Additionally, the scan signal SCAN and the sensing signal SENSE may be applied, causing the first transistor T1 and the second transistor T2 to turn on. As a result, each of the first node N1 and the second node N2 of the driving transistor DRT is initialized to the respective voltages of the first sensing data V1 and the reference voltage Vref (VN1=Vdata, VN2=Vref).

The tracking period T2 is the duration during which the sensing voltage is charged to the pixel PX, and the voltage VN2 of the second node N2 of the driving transistor DRT is varied until reaching the threshold voltage or a voltage state reflecting its variation. That is, the tracking period T2 is the stage during which the voltage of the second node N2 of the driving transistor DRT is tracked to reflect the threshold voltage or its variation. During the tracking period T2, the initialization switch SPRE or the second transistor T2 is turned off, causing the second node N2 of the driving transistor DRT to become floating. As a result, the voltage VN2 of the second node N2 of the driving transistor DRT increases.

The voltage VN2 of the second node N2 of the driving transistor DRT increases until it saturates, gradually reducing the magnitude of the voltage increase. The saturated voltage of the second node N2 of the driving transistor DRT may correspond to the difference between the first sensing data voltage V1 and the threshold voltage Vth or the difference between the first sensing data voltage V1 and the threshold voltage deviation ΔVth.

Once the voltage VN2 of the second node N2 of the driving transistor DRT reaches saturation, the sampling period T3 may proceed. The sampling period T3 is the duration during which the voltage reflecting the threshold voltage or its variation of the driving transistor DRT is measured, and it is a stage where the sensing unit 220 senses the voltage charged to the pixel PX, i.e., the voltage on the readout line RVL. During this sampling period T3, the sampling switch SAM is turned on, and the sensing unit 220 is connected to the readout line RVL to sense the voltage on the readout line RVL, i.e., the voltage VN2 of the second node N2 of the driving transistor DRT.

The voltage Vsen sensed by the sensing unit 220 may be the voltage difference between the first sensing data voltage V1 and the threshold voltage Vth (V1−Vth), or the voltage difference between the first sensing data voltage V1 and the threshold voltage deviation ΔVth (V1−ΔVth). Here, the threshold voltage Vth may be a positive threshold voltage or a negative threshold voltage.

Sensing the threshold voltage of the driving transistor DRT in the above-described manner may take a relatively long duration for the voltage saturation of the second node N2 of the driving transistor DRT. Therefore, the sensing of the threshold voltage of the driving transistor DRT may be performed during an off-sensing process triggered by the occurrence of a power-off signal generated by a user input or the like, i.e., while the display is not actively working and there is no intention from the user to view the display.

With reference to FIG. 6, in another embodiment, the second sensing data voltage V2 may be higher than the first sensing data voltage V1 applied in the embodiment of FIG. 5. In this case, the second sensing data voltage V2 may be determined by applying a determined gain value, predetermined or dynamically determined, to the first sensing data voltage V1. For example, the second sensing data voltage V2 may be determined as the product of the first sensing data voltage V1 and a gain value (V2=V1×gain), which can be predetermined and/or dynamically determined. The gain value may be a constant greater than 1 and set uniformly or variably for different pixels PX.

In such overdriving sensing drive, during the sampling period T3, the first sensing data voltage V1 may be reapplied for stabilizing the sensing voltage. That is, in the overdriving sensing drive, the overdriven second sensing data voltage V2 is applied to the pixel PX to accelerate the saturation time, during the initialization period T1 and tracking period T2, and then is reduced to the first sensing data voltage V1 for the sampling period T3, allowing the measurement of a stabilized sensing voltage.

By overdriving the sensing data voltage from the first sensing data voltage V1 by a determined gain value, predetermined or dynamically determined, as described above, the voltage saturation time can be significantly reduced. That is, by applying a relatively higher sensing data voltage, as shown in FIG. 6, the voltage VN2 of the second node N2 can saturate within a relatively shorter period of time, thus reducing the threshold voltage sensing time.

The overdriving sensing drive and the corresponding gain value may be indicated through control signals transmitted from the timing controller 10 to the data driver 20. For example, the overdriving sensing drive and the corresponding sensing data voltage (such as the gain value) may be transmitted from the timing controller 10 to the data driver 20 through EPI wire pairs.

Figure 7:
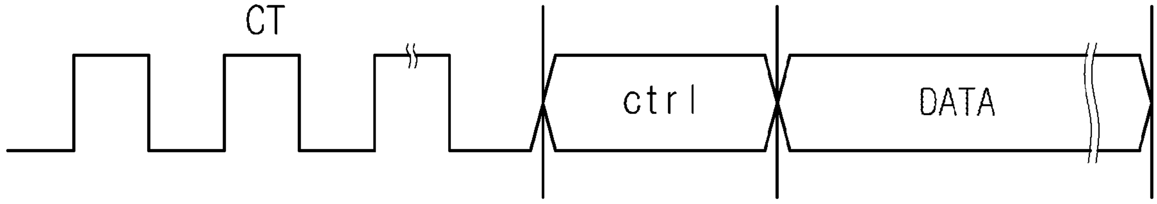
FIG. 7 is a timing diagram illustrating signals from a timing controller to a data driver according to an embodiment.
Figure 8:
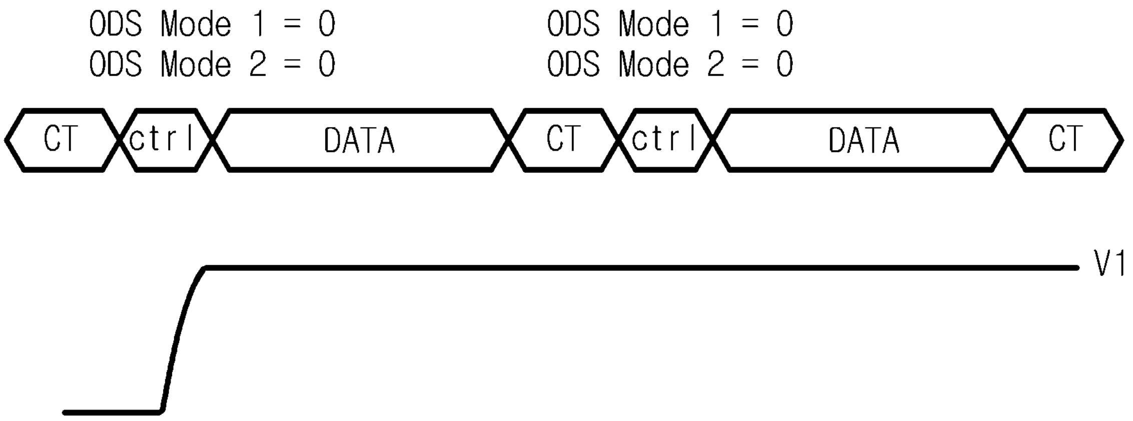
FIG. 8 is a timing diagram illustrating changes in sensing data voltage in a normal sensing drive mode.
Figure 9:
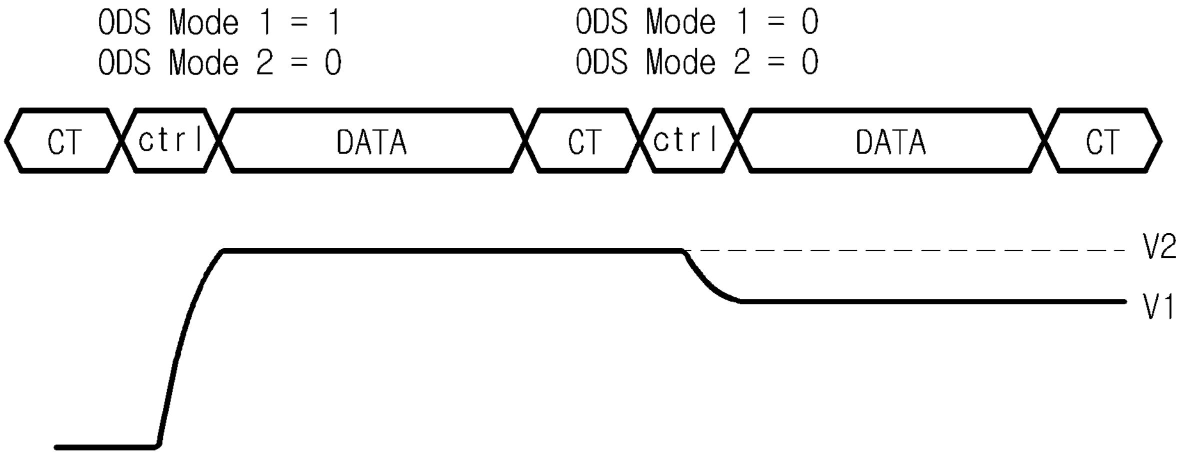
FIG. 9 is a timing diagram illustrating changes in sensing data voltage in an overdriving sensing drive mode.
Figure 10:
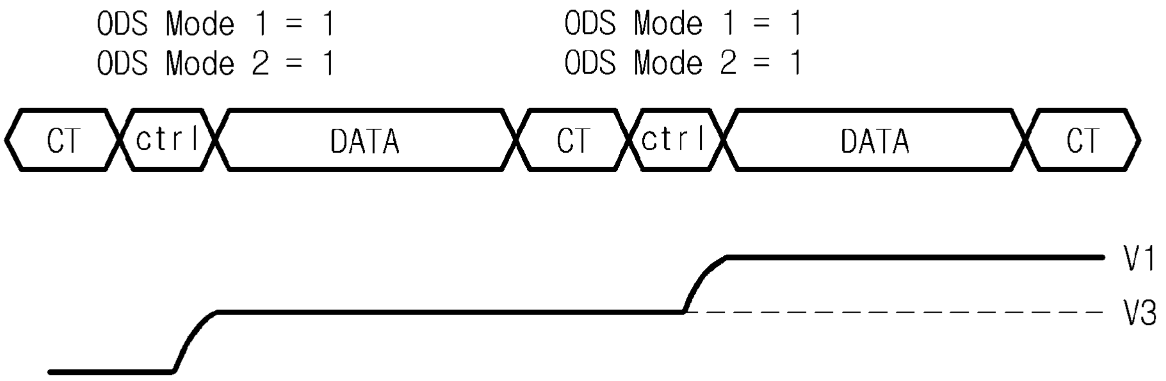
FIG. 10 is a timing diagram illustrating changes in sensing data voltage in a sensing pre-charge drive mode.

FIG. 7 is a timing diagram illustrating signals from a timing controller to a data driver according to an embodiment. FIG. 8 is a timing diagram illustrating changes in sensing data voltage in a normal sensing drive mode. FIG. 9 is a timing diagram illustrating changes in sensing data voltage in an overdriving sensing drive mode. FIG. 10 is a timing diagram illustrating changes in sensing data voltage in a sensing pre-charge drive mode.

With reference to FIG. 7, the timing controller 10 may sequentially transmit the clock training pattern CT, control data ctrl, and video data DATA to the data driver 20.

The clock training pattern CT is a clock signal used to synchronize the operation timing between the timing controller 10 and the data driver 20, and it may be a sinusoidal waveform. The video data DATA may include gradation values of red (R), green (G), and (B) color components.

The control data ctrl may include information indicating the start of control data ctrl, the start position of video data DATA, and the rising time and pulse width of the source output enable signal. The control data ctrl may also include source control data and gate control data.

The control data ctrl may also include control packets for controlling various functions implemented in the data driver 20. Control packets may be used to indicate the aforementioned information using low or high levels. In an embodiment, the information corresponding to the bits constituting the control packets may be defined as shown in Table 1.

TABLE 1

| Bit | CTR_A | CTR_B | CTR_C |
|---|---|---|---|
| 0 | CK | CK | CK |
| 1 | CK | CK | CK |
| 2 | ODS Mode 1 | ODS_OFF_SET_A | ODS_Pre_OFF_A |
| 3 | ODS Mode 2 | | |
| 4 | | | |
| 5 | | | |
| 6 | | | |
| 7 | | | |
| 8 | | | |
| 9 | | | |
| 10 | | | |
| 11 | | | |
| 12 | | ODS_OFF_SET_B | ODS_Pre_OFF_B |
| 13 | | | |
| 14 | | | |
| 15 | | | |
| 16 | | | |
| 17 | | | |
| 18 | | | |
| 19 | | | |
| 20 | | | |
| 21 | | | |
| 22 | DMY | DMY | DMY |
| 23 | DMY | DMY | DMY |

In the control packet Table 1, the overdriving sensing drive mode may be indicated by a 2-bit data included in control A packet (CTR_A). In detail, the second and third bits of control A packet (CTR_A) are control signals indicating the overdriving sensing drive and the specific overdriving sensing drive mode.

In this case, the overdriving sensing drive mode corresponding to the values of the 2-bit data composing the overdriving sensing control signal can be determined as shown in Table 2.

TABLE 2

| ODS Mode 1 | ODS Mode 2 | Description |
|---|---|---|
| 0 | 0 | ODS (Over Driving Sensing) OFF |
| 1 | 0 | ODS ON |
| 1 | 1 | ODS Pre Charge mode |

When the 2-bit data of the overdriving sensing control signal may be set to '00' for the normal sensing drive mode, '10' for the overdriving sensing drive mode, and '11' for the sensing pre-charge drive mode. Based on the aforementioned overdriving sensing control signal, the sensing data voltage may be configured accordingly.

The sensing data voltage is set to the first sensing data voltage V1 in the normal sensing mode as shown in FIG. 8, and it is set to the second sensing data voltage V higher than the first sensing data voltage V1 in the overdriving sensing drive mode as shown in FIG. 9. In the sensing pre-charge mode, a determined pre-charge data voltage V3, predetermined or dynamically determined, may be applied during pre-charge period before the initialization period T1 and then the first sensing data voltage V1 may be applied as shown in FIG. 10. In this pre-charge mode, by pre-charging the voltage VN2 of the second node N2 within the pixel PX with a determined pre-charge data voltage V3, the time for the voltage (VN2) of the second node N2 to reach saturation may be reduced.

The offset value for the video data DATA in the overdriving sensing drive mode may be indicated through the control B packet (CTR_B, the second control packet) among the control packets in Table 1. For example, the offset may be indicated by a 10-bit data included in the control B packet (CTR_B). In detail, bits 2 to 11 of the control B packet (CTR_B) may indicate the first offset value, while bits 12 to 21 may indicate the second offset value.

The offset value may be determined through sensing the characteristic values of the driving transistor DRT within the pixel PX and transmitted to the data driver 20 through the control packets. The data driver 20 may obtain the offset from the control packets and apply the acquired offset to the video data DATA that is transmitted in RGB format, resulting in compensated video data MDATA generation.

In addition, the offset value for the video data DATA in the sensing pre-charge drive mode may be indicated through the control C packet (CTR_C, the third control packet) among the control packets in table 1. For example, the offset may be indicated by a 10-bit data included in the control C packet (CTR_C). In detail, bits 2 to 11 of the control C packet (CTR_C) may indicate the first offset, while bits 12 to 21 may indicate the second offset.

FIG. 11 is a block diagram illustrating a configuration of a data driver according to an embodiment.

With reference to FIG. 11, the data driver 20 includes a data supply unit 210, a sensing unit 220, and a current source 230.

The data supply unit 210 includes a receiver 211, a shift register 212, a first latch 213, a second latch 214, a digital-to-analog converter (DAC) 215, and an output buffer 216.

The receiver 211 may receive signals supplied through various interface technologies such as LVDS interface, EPI, DisplayPort (DP), or Embedded DP (eDP) interfaces from the timing controller 10 and recover video data DATA and source control signals SSP, SSC, and SOE from the received signals for output. In an embodiment, the video data DATA received through the receiver 211 may be the video data compensated for the gain values through pixel sensing. The source control signals may include a source start pulse signal SSP, a source sampling clock signal SSC, and a source output enable signal SOE. The source start pulse SSP is responsible for controlling the starting point of data sampling in the source drive IC. The source sampling clock SSC is a clock signal responsible for controlling the data sampling operation in the source drive IC based on the rising or falling edge. The source output enable signal SOE is responsible for controlling the output of the source drive IC.

The receiver 211 may be configured to include a serial-parallel converter. In an embodiment, the receiver 211 may receive a control packet form the timing controller 10 through the EPI interface or the like and obtain control information for the overdriving sensing drive from the control packet.

The shift register 212 responds to the source start pulse SSP and source sampling clock SSC provided by the timing controller 10 to generate sampling signals.

The first latch 213 responds to the sequential sampling signals from the shift register 212 to sequentially latch and output the digital video data DATA after parallel latching. The first latch 213 simultaneously outputs the video data DATA sampled on one horizontal line in response to the source output enable signal SOE.

The second latch 214 latches the data input from the first latch 213 and outputs the latched video data DATA simultaneously with the second latches of other source drive ICs during the logic low period of the source output enable signal SOE.

The DAC 215 receives gamma gradation voltages GV and converts the video data MDATA of one horizontal line into data voltages Vdata based on gamma gradation voltages GV. That is, the DAC 215 may convert the digital video data MDATA into analog data voltages Vdata. The output buffer 216 supplies the data voltages Vdata output from the DAC 215 to the data line DL according to the source output enable signal SOE.

In an embodiment, the data supply unit 210 may include an offset compensator 217. The offset compensator 217 may restore the offset from the control packet received through the receiver 211 from the timing controller 10 and convert the restored digital offset into analog form to provide it to the DAC 215.

In an embodiment, the offset value may be transmitted from the timing controller 10 to the second latch 214 and outputted from the second latch 214 to the offset compensator 217. However, this embodiment is not limited thereto.

The offset compensator 217 may convert the digital offset value into an analog voltage and output it to the DAC 215. The offset compensator 217 may include a DAC for this purpose. The offset value (offset) may be applied to the data voltage Vdata output from the DAC 215 to generate a final compensated data voltage Vdata.

The sensing unit 220 includes a current-voltage converter 221, a noise canceler 222, and an ADC 223.

The current-voltage converter 221 converts channel-specific input currents from the display panel 50 or current source 230 into voltage sensing values through current integration. The noise canceler 222 cancels the noise sensed through adjacent channels from the actual sensing values of the channel-specific current-voltage converter 221 and outputs channel sensing values. The ADC 223 converts the channel sensing values supplied from the noise canceler 222 or the pixel sensing values bypassing the noise canceler 224 from the current-voltage converter 221 into digital data and outputs the converted data as sensing data Vsen to the timing controller 10.

Meanwhile, the current source 230 is described as being provided within the data driver 20 in the illustrated embodiment, but this embodiment is not limited thereto. That is, in an alternative embodiment, the current source 230 may be located separately outside the data driver 20.

Figure 12:
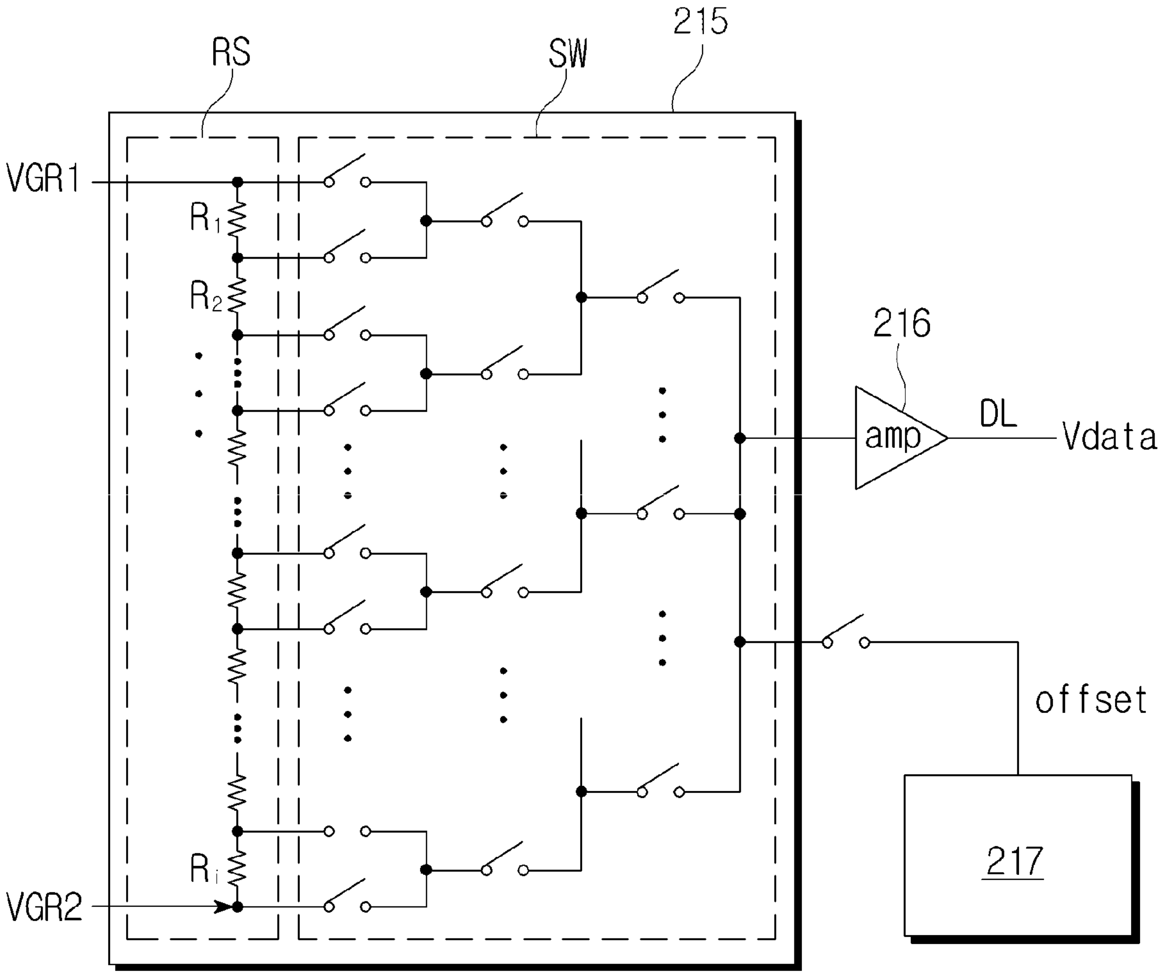
FIG. 12 is a circuit diagram illustrating a DAC and output buffer in FIG. 11.

FIG. 12 is a circuit diagram illustrating a DAC and output buffer in FIG. 11.

With reference to FIG. 12, the DAC 215 includes a resistor string RS and a switch unit SW.

The resistor string RS consists of a plurality of resistors (R1 to Ri, where i is a natural number), and these resistors R1 to Ri are connected in series between the first and second gamma reference voltages VGR1 and VGR2. The resistor string RS receives the first and second gamma reference voltages VGR1 and VGR2 and may output a plurality of gamma calibration voltages GV through the nodes between multiple resistors R1 to Ri.

The switch unit SW may a plurality of switches. Each switch be connected to nodes between multiple resistors R1 to Ri to receive gamma gradation voltages GV. The switch unit SW may convert the video data DATA output from the second latch 214 into corresponding one of gamma gradation voltages GV and output the converted gamma gradation voltage. In an embodiment, the switches may be composed of transistors.

The output buffer 216 may include an amplifier (amp) to amplify or compensate for the data voltage Vdata output from the DAC 215. The output buffer 216 may output the gamma reference voltages GV from the switch unit SW to the data line DL as data voltage Vdata.

In an example, the offset compensator 217 may be connected to the output terminal of the switch unit SW. The offset compensator 217 may obtain the offset value (offset) from the control packet transmitted from the timing controller 10. The offset compensator 217 may convert the digital offset value (offset) into analog offset voltage and apply it to the output terminal of the switch unit SW. At the output terminal of the switch unit SW, the gamma reference voltages GV may be combined with the offset voltage to generate the data voltage Vdata as the output.

A display device and driving method thereof according to the embodiments is capable of reducing the sensing time of the threshold voltage by overdriving the sensing data voltage supplied to the pixels during the sensing process.

The display device and driving method thereof according to the embodiments is capable of improving the production yield of the product by reducing the manufacturing time through the reduction of sensing time.

The display device and driving method thereof according to the embodiments is capable of lowering the design complexity of the data driver by compensating for the gain value of the video data through timing control.

The display device and driving method thereof according to the embodiments is capable of decreasing the influence of noise in video data compensation and increasing sensing reliability by compensating for the offset value of the video data through the data driver.

Although embodiments of this disclosure have been described above with reference to the accompanying drawings, it will be understood that the technical configuration of the this disclosure described above can be implemented in other specific forms by those skilled in the art without changing the technical concept or features of the present disclosure. Therefore, it should be understood that the embodiments described above are examples and not limited in all respects. In addition, it should be understood that all modifications or variations derived from the meaning and scope of the claims and their equivalent concept are included within the scope of this disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A display device comprising:

a display panel comprising a plurality of pixels arranged thereon;

a data driver configured to apply a sensing data voltage to the plurality of pixels and sense a characteristic value as sensing data in response to the sensing data voltage; and a timing controller configured to determine compensation data to compensate video data based on the sensing data and transmit the compensation data and a control signal to the data driver, wherein the data driver is configured to apply a first sensing data voltage to the plurality of pixels in a normal sensing drive mode and a second sensing data voltage higher than the first sensing data voltage to the plurality of pixels in an overdriving sensing drive mode, wherein the data driver is configured to sense, upon a sensing voltage is applied to the pixels during a tracking period, the sensing voltage during a sampling period, to apply the second sensing data voltage to the plurality of pixels during an initialization period in the overdriving sensing drive mode, and to apply the first sensing data voltage lower than the second sensing data voltage to the plurality of pixels during the sampling period.

2. The display device of claim 1, wherein the timing controller is configured to calculate one or more of a gain value or an offset value as part of the compensation data for compensating the video data based on the sensing data and to transmit the one or more of the gain value or the offset value to the data driver.

3. The display device of claim 2, wherein the data driver is configured to compensate the video data received from the timing controller based on the offset value.

4. The display device of claim 2, wherein the data driver comprises:

a receiver configured to receive the video data from the timing controller;

a shift register configured to output a sampling signal in response to the control signal;

a latch configured to latch and output the video data in response to the sampling signal;

a digital-to-analog converter configured to convert the video data output from the latch into an analog data voltage;

an output buffer configured to supply the analog data voltage from the digital-to-analog converter to the plurality of pixels through a data line; and an offset compensator configured to convert the offset value received from the timing controller into an analog offset voltage and provide the analog offset voltage to the digital-to-analog converter.

5. The display device of claim 4, wherein the digital-to-analog converter comprises:

a resister string configured to divide between a first gamma reference voltage and a second gamma reference voltage and output a plurality of gamma gradation voltages; and a switch unit configured to output at an output terminal a gamma gradation voltage, among the plurality of gamma gradation voltages, corresponding to the video data output from the latch, wherein the offset compensator is connected to the output terminal of the switch unit.

6. The display device of claim 1, wherein the control signal comprises a 2-bit data indicative of the normal sensing drive mode, the overdriving sensing drive mode, or a sensing pre-charge drive mode.

7. The display device of claim 6, wherein the control signal comprises a first offset value for compensating an offset of the video data in the overdriving sensing drive mode and a second offset value for compensating the offset of the video data in the sensing pre-charge drive mode.

8. The display device of claim 1, wherein the data driver is configured to apply a pre-charge data voltage lower than the first sensing data voltage to the plurality of pixels during a pre-charge period in the sensing pre-charge drive mode and to apply the first sensing data voltage to the plurality of pixels during the initialization period.

9. A method for driving a display device including a display panel including a plurality of pixels arranged thereon, a data driver applying data voltage to the plurality of pixels, and a timing controller controlling the data driver, the method comprising:

applying a second sensing data voltage to the plurality of pixels during an initialization period;

charging the pixels with a sensing voltage during a tracking period;

applying a first sensing data voltage to the pixels and sensing a characteristic of the plurality of pixels as sensing data in response to applying the first sensing data voltage to the pixels during a sampling period; and compensating video data to be applied to the plurality of pixels based on the sensing data, wherein the data driver is configured to apply a first sensing data voltage to the plurality of pixels in a normal sensing drive mode and a second sensing data voltage to the plurality of pixels in an overdriving sensing drive mode, wherein the data driver is further configured to sense, upon the sensing voltage is applied to the pixels during the tracking period, the sensing voltage during the sampling period, to apply the second sensing data voltage to the plurality of pixels during an initialization period in the overdriving sensing drive mode, and to apply the first sensing data voltage lower than the second sensing data voltage to the plurality of pixels during the sampling period.

10. The method of claim 9, wherein the compensating the video data comprises:

calculating, by the timing controller, a gain value and an offset value for compensating the video data based on the sensing data; and compensating the video data based on the gain value; and transmitting the gain value-compensated video data and the offset value to the data driver.

11. The method of claim 10, wherein the compensating the video data further comprises compensating, by the data driver, the gain value-compensated video data received from the timing controller based on the received offset value.

12. A display device comprising:

a display panel including a plurality of pixels arranged thereon;

a data driver configured to apply a first sensing voltage to a pixel in a first sensing drive mode and a second sensing voltage higher than the first sensing voltage to the pixel in a second sensing drive mode, and sense a characteristic of the pixel in response to the first sensing voltage or the second sensing voltage being applied to the pixel, wherein the data driver is configured to sense, upon a sensing voltage is applied to the pixels during a tracking period, the sensing voltage during a sampling period, to apply the second sensing data voltage to the plurality of pixels during an initialization period in the overdriving sensing drive mode, and to apply the first sensing data voltage lower than the second sensing data voltage to the plurality of pixels during the sampling period.

13. The display device of claim 12, comprising a timing controller configured to send a control signal to the data driver, the control signal indicating the first sensing drive mode or the second sensing drive mode.

14. The display device of claim 13, wherein the data driver is configured to apply a pre-charge voltage lower than the first sensing voltage to the pixel during a pre-charge period in a third sensing drive mode and to apply the first sensing data voltage to the pixel during an initialization period in the third sensing drive mode.

15. The display device of claim 13, wherein the timing controller is configured to determine compensation to video data based on the characteristic of the pixel.

* * * * *